US012441129B2

(12) United States Patent
Nomura

(10) Patent No.: US 12,441,129 B2
(45) Date of Patent: Oct. 14, 2025

(54) PRINTER

(71) Applicant: Toshiba Tec Kabushiki Kaisha, Tokyo (JP)

(72) Inventor: Susumu Nomura, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 195 days.

(21) Appl. No.: 18/326,762

(22) Filed: May 31, 2023

(65) Prior Publication Data

US 2024/0140113 A1 May 2, 2024

(30) Foreign Application Priority Data

Oct. 26, 2022 (JP) ................................ 2022-171480

(51) Int. Cl.
*B41J 15/04* (2006.01)
*B41J 3/407* (2006.01)

(52) U.S. Cl.
CPC ............ *B41J 15/04* (2013.01); *B41J 3/4075* (2013.01)

(58) Field of Classification Search
CPC ................................ B41J 15/00; B41J 15/04
See application file for complete search history.

(56) References Cited

U.S. PATENT DOCUMENTS

| | | | | |
|---|---|---|---|---|
| 6,302,604 | B1 | 10/2001 | Bryant et al. | |
| 2012/0183342 | A1* | 7/2012 | Lan | B41J 15/042 400/613 |
| 2016/0325563 | A1 | 11/2016 | Kokuta | |
| 2021/0187982 | A1* | 6/2021 | Kakui | B41J 3/4075 |
| 2023/0033033 | A1* | 2/2023 | Wehrmann | B41J 15/046 |

FOREIGN PATENT DOCUMENTS

| | | | | |
|---|---|---|---|---|
| JP | 2007-126229 | A | | 5/2007 |
| KR | 1503024 | B1 | * | 3/2015 |
| KR | 101503024 | B1 | | 3/2015 |

OTHER PUBLICATIONS

Ho, Machine TranslationofKR-1503024-B1, 2015 (Year: 2015).*
Extended European Search Report dated Mar. 26, 2024, mailed in corresponding European Patent Application No. 23187336.5, 18 pages.

* cited by examiner

*Primary Examiner* — Scott A Richmond
(74) *Attorney, Agent, or Firm* — Kim & Stewart LLP

(57) ABSTRACT

In accordance with an embodiment, a printer according to the embodiment includes: a holder of a rolled print medium. The holder includes a moving member that is provided to be slidable on a shaft member to be inserted through a support hole of the rolled print medium in an axial direction and includes a guide member that can stand and fall with respect to the shaft member. Further, the holder includes an adjustment member that makes a pressure contact force of a biasing member that presses the shaft member and the moving member together to restrain sliding movement of the moving member with respect to the shaft member larger in a standing state of the guide member than in a fallen state of the guide member.

10 Claims, 10 Drawing Sheets

PRINTER

CROSS-REFERENCE TO RELATED APPLICATIONS

This application is based upon and claims the benefit of priority from the prior Japanese Patent Application No. 2022-171480, filed on Oct. 26, 2022, the entire contents of which are incorporated herein by reference.

FIELD

An embodiment to be described here generally relates to a printer.

BACKGROUND

In the past, a printer that prints on a print medium wound in a roll (hereinafter, referred to also as “rolled paper”) has been known. For example, in a label printer that prints on mounting paper with a plurality of labels attached at predetermined intervals, a surface of the label is printed by feeding the wound mounting paper to a printing unit. The rolled paper includes mounting paper to which labels are attached and a roll support around which the mounting paper is wound and is also called a paper tube.

As this type of printer, one including a holder that rotatably supports rolled paper and guides the rolled paper so as not to move in the width direction is proposed. The holder includes a support shaft that causes the paper tube of the rolled paper to be inserted therethrough and a guide provided to be able to stand and fall on the support shaft. The guide enters a fallen state when the support shaft causes the paper tube to be inserted therethrough to allow the support shaft to be inserted through the paper tube, and enters a standing state to guide the rolled paper in the width direction after the support shaft causes the paper tube to be inserted therethrough. Further, the guide is provided to be movable in the axial direction (width direction of the rolled paper) with respect to the support shaft so as to be capable of guiding the rolled paper to be used in accordance with the width of the rolled paper.

It is desirable that the guide in the fallen state has a low braking force on the shaft member so that it can be easily aligned by a user. Further, it is desirable that the guide in the standing state has a large braking force on the shaft member so as to be capable of reliably guiding the rolled paper.

Some holders of existing printers have a simple structure in which the support shaft and the guide are pressed together with a spring to apply a braking force to the guide and restrain the movement of the guide. However, in this case, the braking force applied to the guide is the same in both the fallen state and the standing state, and there is a trade-off relationship between the improved operability for a user in the fallen state and the reliable guide of the rolled paper in the standing state. For this reason, it is desired to achieve both favorable operability and reliable guide of the rolled paper while simplifying the configuration of the holder that supports the rolled paper.

DETAILED DESCRIPTION

Figure 1:
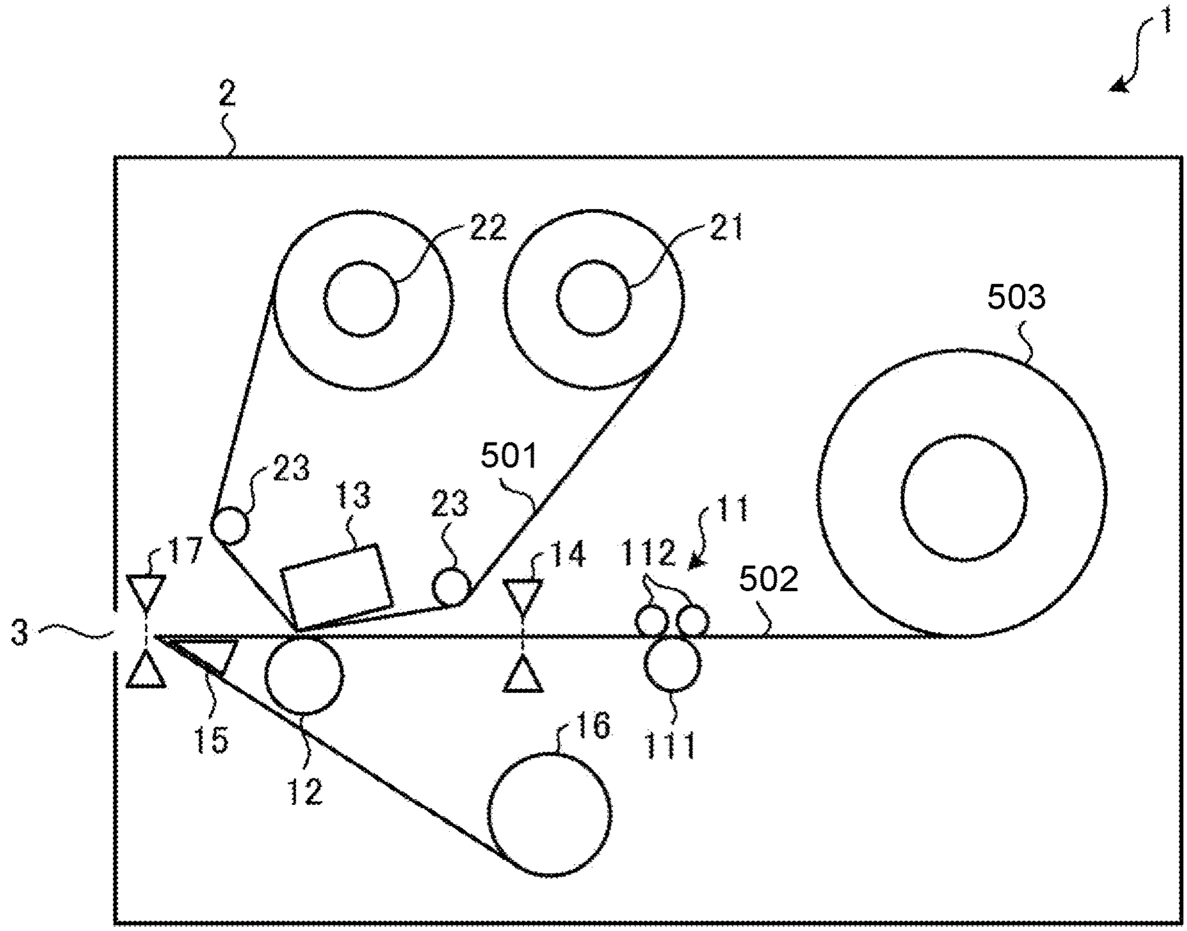
FIG. 1 is a schematic diagram showing a schematic configuration of a label printer according to an embodiment.

In accordance with an embodiment, a printer includes: a holder; and a printing unit. The holder rotatably supports a rolled print medium. The printing unit prints on the rolled print medium fed out from the holder. The holder includes a shaft member, a moving member, a biasing member, and an adjustment member. The shaft member is to be inserted through a support hole formed in the rolled print medium in an axial direction. The moving member is provided to be slidable on the shaft member in the axial direction and includes a guide member that can stand and fall with respect to the shaft member. The biasing member presses the shaft member and the moving member together to restrain sliding movement of the moving member with respect to the shaft member. The adjustment member makes a pressure contact force applied by the biasing member to the shaft member and the moving member larger in a standing state of the guide member than in a fallen state of the guide member.

Hereinafter, a printer according to an embodiment will be described in detail with respect to the drawings. In the drawings, the same reference symbols indicate the same or similar portions. Note that the embodiment is not limited by the following description. For example, although an example in which a label printer that prints on a label is used as a printer will be described in this embodiment, the embodiment is not limited thereto. An arbitrary printer can be used as long as it prints on a rolled print medium.

A schematic configuration of a label printer will be described first. FIG. 1 is a schematic diagram showing a schematic configuration of a label printer according to an embodiment.

In a label printer 1, rolled paper 503 in which label paper 502 is wound in a roll is housed in a casing 2. The rolled paper 503 is rotatably supported by a holder 30 (see FIG. 2 and the like) described below. The rolled paper 503 is an example of a rolled print medium. In the label paper 502, a plurality of labels are attached at predetermined intervals to long mounting paper. The label printer 1 prints on the labels while drawing out the label paper 502 from the rolled paper 503.

The label printer 1 includes, inside the casing 2, a conveying roller 11, a platen roller 12, a print head 13, an interlabel detection sensor 14, a peeling guide 15, a winding roller 16, and a peeling detection sensor 17. Further, the label printer 1 includes, inside the casing 2, a ribbon holding shaft 21, a ribbon winding shaft 22, and a guide shaft 23.

The conveying roller 11 includes a capstan roller 111 and two auxiliary rollers 112. The label paper 502 drawn out form the rolled paper 503 is inserted between the capstan roller 111 and the auxiliary rollers 112. The platen roller 12 is disposed at a position facing the print head 13. The label paper 502 is inserted between the platen roller 12 and the print head 13.

The capstan roller 111 and the platen roller 12 are driven to rotate by a first drive motor (not shown). For example, the first drive motor causes, when printing on the label paper 502, the capstan roller 111 and the platen roller 12 to rotate counterclockwise in the figure to convey the label paper 502 toward an outlet 3. Further, the first drive motor causes, after printing on a label, the capstan roller 111 and the platen roller 12 to rotate clockwise in the figure to convey the label paper 502 in the opposite direction in order to return the next label to the print start position.

Figure 2:
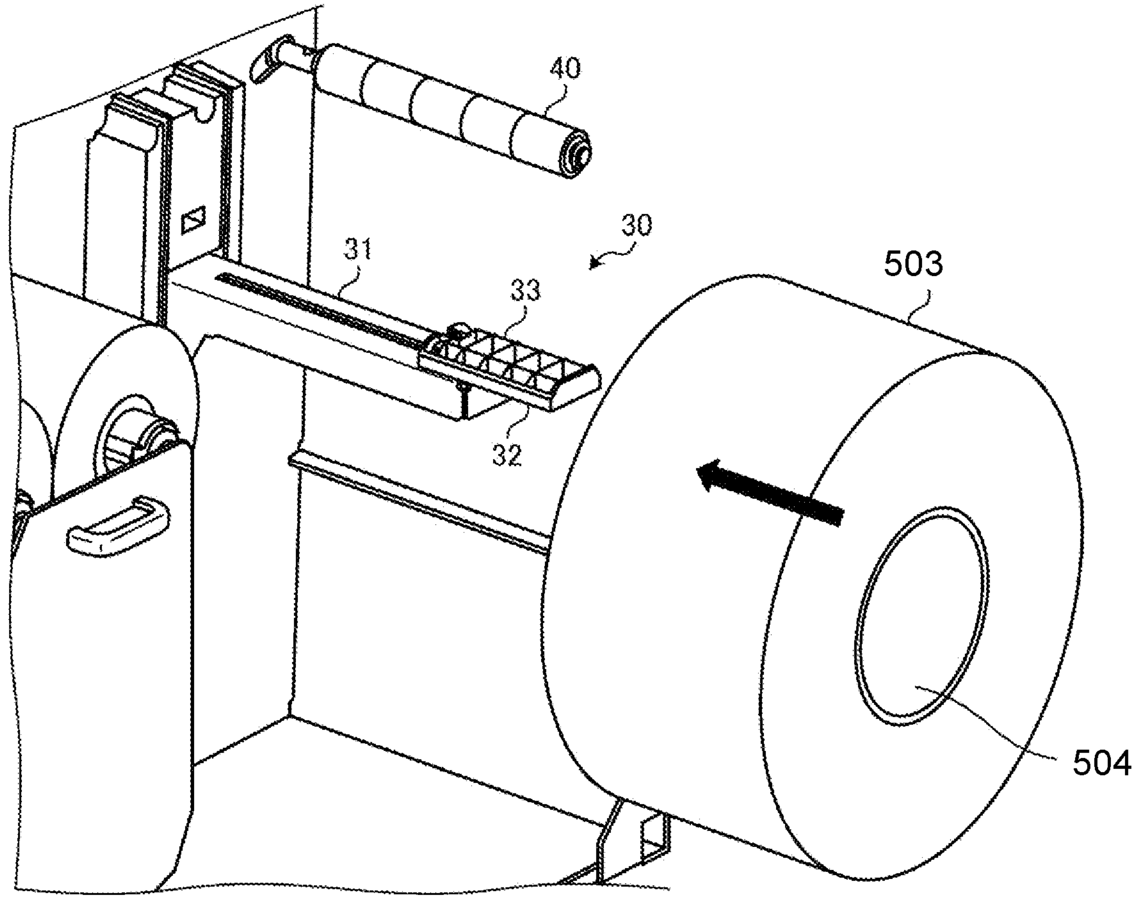
FIG. 2 is a diagram showing a first state when setting rolled paper in the label printer according to the embodiment.

The print head 13 is an example of a printing unit that prints on a rolled print medium fed out from the holder 30 (see FIG. 2 and the like). The print head 13 according to this embodiment is a thermal head having a structure in which a plurality of heating elements is aligned. The print head 13 heats the heating elements corresponding to a print pattern to print on the label of the label paper 502 sandwiched between the platen roller 12 and the print head 13.

Specifically, an ink ribbon 501 is inserted between the platen roller 12 and the print head 13. The ink applied to the ink ribbon 501 is transferred to the label of the label paper 502 by the heated print head 13.

The ink ribbon 501 is suspended between the ribbon holding shaft 21 and the ribbon winding shaft 22. The ribbon holding shaft 21 winds the unused ink ribbon 501 in a roll. The ribbon winding shaft 22 is a shaft for winding the ink ribbon 501. Further, the guide shaft 23 is a guide member for guiding the ink ribbon 501 suspended between the ribbon holding shaft 21 and the ribbon winding shaft 22 into a predetermined position. The ribbon winding shaft 22 is driven to rotate clockwise in the figure by a second drive motor (not shown) when printing on the label paper 502 and winds the ink ribbon 501.

Note that the print head 13 moves up and down by a moving mechanism (not shown) such as a solenoid. As a result, the label printer 1 is capable of switching between a state where the print head 13 is pressed against the platen roller 12 via the ink ribbon 501 and the label paper 502 and a non-pressure contact state where the print head 13 is away from the platen roller 12. The print head 13 is pressed against the platen roller 12 via the ink ribbon 501 when printing on the label paper 502. Further, the ribbon winding shaft 22 winds, during the printing, the ink ribbon 501 at a speed according to the conveying speed of the label paper 502 and stops the winding when the print head 13 enters the non-pressure contact state described above.

The interlabel detection sensor 14 is provided on a conveying path of the label paper 502 between the conveying roller 11 and the platen roller 12. The interlabel detection sensor 14 detects a gap between labels (hereinafter, referred to also as a "label gap") from the label paper 502. For example, the interlabel detection sensor 14 can be realized by a transmissive sensor that includes a light-emitting element and a light-receiving device. The interlabel detection sensor 14 detects the label gap on the basis of the light reception level of the light-receiving device when conveying the label paper 502.

The label printer 1 calculates the position of the label from the position of the label gap detected by the interlabel detection sensor 14 and performs position adjustment for positioning the label at the print start position of the print head 13, print timing adjustment, and the like.

The printed label paper 502 is separated into the mounting paper and the label by the peeling guide 15. The peeling guide 15 is formed in a V shape having two faces crossing each other at an acute angle. The peeling guide 15 bends the label paper 502 conveyed toward the outlet 3 to separate the mounting paper and the label from each other. While the mounting paper from which the label has been peeled is wound by the winding roller 16, the label peeled from the mounting paper is discharged (issued) from the outlet 3 provided in the casing 2.

The winding roller 16 winds mounting paper from which the label has been peeled. The winding roller 16 is driven to rotate by a third drive motor (not shown). For example, the third drive motor causes, when printing on the label paper 502, the winding roller 16 to rotate counterclockwise in the figure to wind the mounting paper from which the label has been peeled (the label paper 502).

The peeling detection sensor 17 is installed in the vicinity of the outlet 3 and detects the presence or absence of a label peeled from mounting paper. The peeling detection sensor 17 can be realized by, for example, a transmissive sensor that includes a light-emitting element and a light-receiving device.

When the peeling detection sensor 17 detects a label, the label printer 1 temporarily stops the conveyance and printing of the label paper 502. When a user takes up the label from the outlet 3, the peeling detection sensor 17 detects that no label is present. The label printer 1 restarts the conveyance and printing of the label paper 502 in the case where the peeling detection sensor 17 has detected that no label is present.

Specifically, the label printer 1 conveys, in the case of restarting the printing, the label paper 502 in the direction opposite to the conveying direction at the time of printing by a predetermined amount in order to return the next label following the peeled label to the print start position of the print head 13. The label printer 1 prints, when the conveyance in the opposite direction is completed, on the next label and issues the printed label from the outlet 3.

Next, a method of setting the rolled paper 503 in the label printer 1 will be described. FIG. 2 is a diagram showing a first state when setting the rolled paper 503. The first state is a state before the rolled paper 503 is supported by the holder 30. The holder 30 and a damper roller 40 are provided in the casing 2 of the label printer 1.

The holder 30 includes a shaft member 31 and a moving member 32 provided to be slidable on the shaft member 31. The shaft member 31 is attached to the casing 2 by a cantilever support structure in which one end thereof in the axial direction is attached to the casing 2. The moving member 32 is provided to be slidable on the shaft member 31 in the axial direction thereof. Further, the moving member 32 includes a guide member 33 that can stand and fall with respect to the shaft member 31. Note that details of the structure of the holder 30 will be described below.

The damper roller 40 is attached to the casing 2 by a cantilever support structure in which one end thereof is attached to the casing 2, similarly to the shaft member 31. The damper roller 40 hangs the label paper 502 drawn out from the rolled paper 503 thereon to soften the impact applied to the rolled paper 503 at the moment when the label paper 502 lost its slack during the printing operation. Specifically, the damper roller 40 softens, when the first drive motor is driven to convey the label paper 502 while the label paper 502 is loose, the impact applied to the rolled paper 503 at the moment when the label paper 502 lost its slack.

In order to support the rolled paper 503 on the holder 30, a user causes the guide member 33 to fall with respect to the shaft member 31 (hereinafter, referred to also as a "fallen state") as shown in FIG. 2. That is, the user causes the guide member 33 to extend in the axial direction along the upper surface of the shaft member 31.

Subsequently, the user causes the rolled paper 503 to move in the arrow direction in FIG. 2 to insert the shaft member 31 and the guide member 33 through a support hole 504 (hole of the paper tube) formed in the rolled paper 503 in the axial direction. As a result, the rolled paper 503 is supported by the holder 30. In more detail, the inner surface of the paper tube of the rolled paper 503 is placed on the shaft member 31. At this time, the user draws out the label paper 502 from the rolled paper 503 and hangs the label paper 502 on the damper roller 40.

Figure 3:
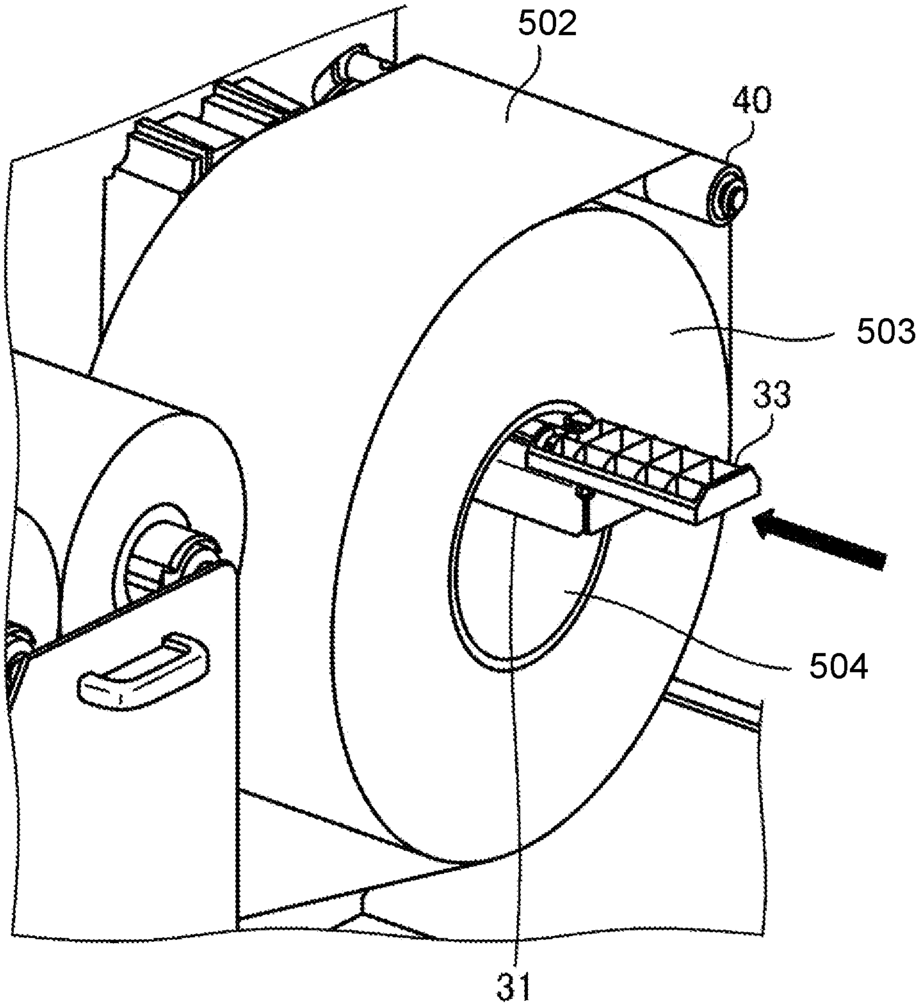
FIG. 3 is a diagram showing a second state when setting rolled paper in the label printer according to the embodiment.

FIG. 3 is a diagram showing a second state when setting the rolled paper 503. The second state is a state where the rolled paper 503 is supported by the holder 30 as described above. In the second state, the rolled paper 503 is not positioned in the axial direction of the shaft member 31 (width direction of the rolled paper 503). The user causes the guide member 33 to be slid in the arrow direction in FIG. 3 until one end of the guide member 33 abuts on the rolled paper 503. As a result, the guide member 33 is positioned at a position corresponding to the width of the rolled paper 503 in the axial direction of the shaft member 31.

Figure 4:
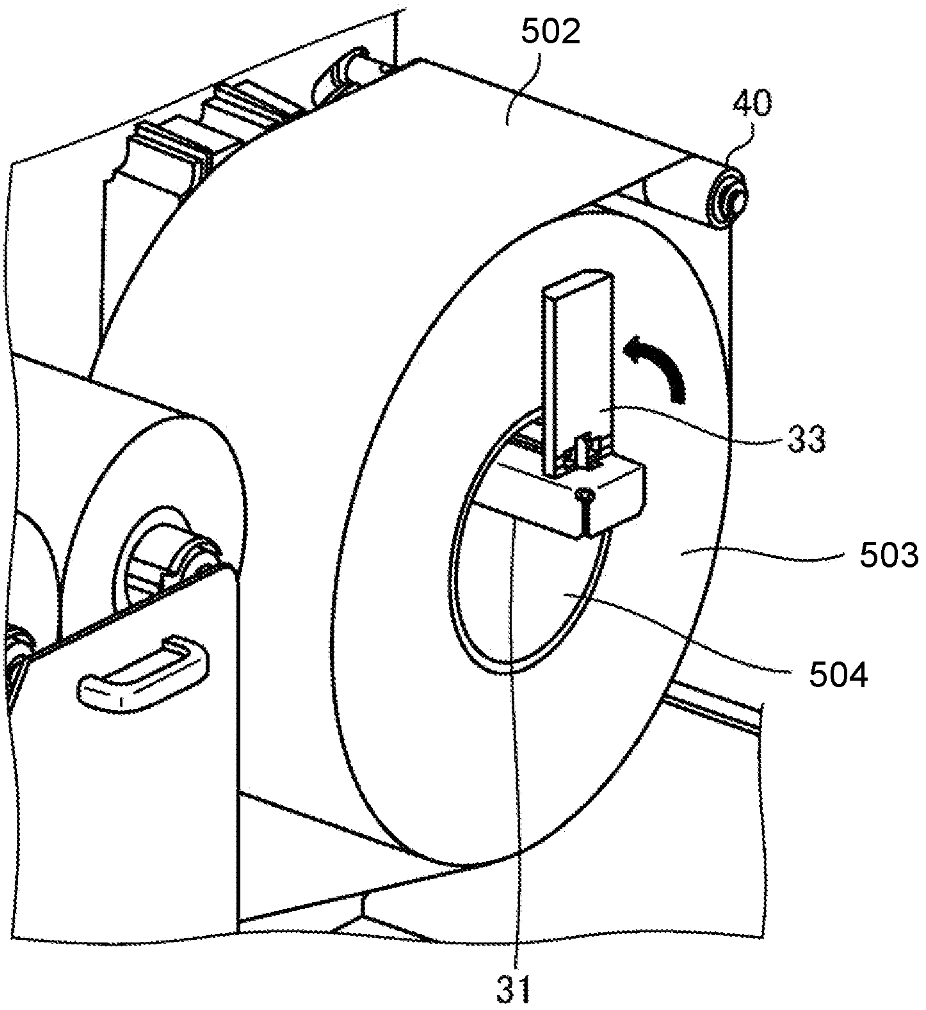
FIG. 4 is a diagram showing a third state when setting rolled paper in the label printer according to the embodiment.

FIG. 4 is a diagram showing a third state when setting the rolled paper 503. The third state is a state where the rolled paper 503 is set in the holder 30. After the guide member 33 is positioned, the user causes the guide member 33 to stand with respect to the shaft member 31 (hereinafter, referred to also as a "standing state") to allow the rolled paper 503 to be set in the holder 30. The user can cause the guide member 33 to stand with respect to the shaft member 31 by causing the other end (tip) of the guide member 33 to rotate in the direction indicated by the arrow in FIG. 4.

In the third state shown in FIG. 4, the holder 30 is capable of rotatably supporting the rolled paper 503 when the shaft member 31 supports the paper tube of the rolled paper 503. Further, the holder 30 is capable of guiding the rolled paper 503 so as not to move in the axial direction when the guide member 33 abuts on the end surface of the rolled paper 503 in the width direction. In other words, the holder 30 is capable of rotatably supporting the rolled paper 503 as well as restraining the movement of the rolled paper 503 in the axial direction.

Figure 5:
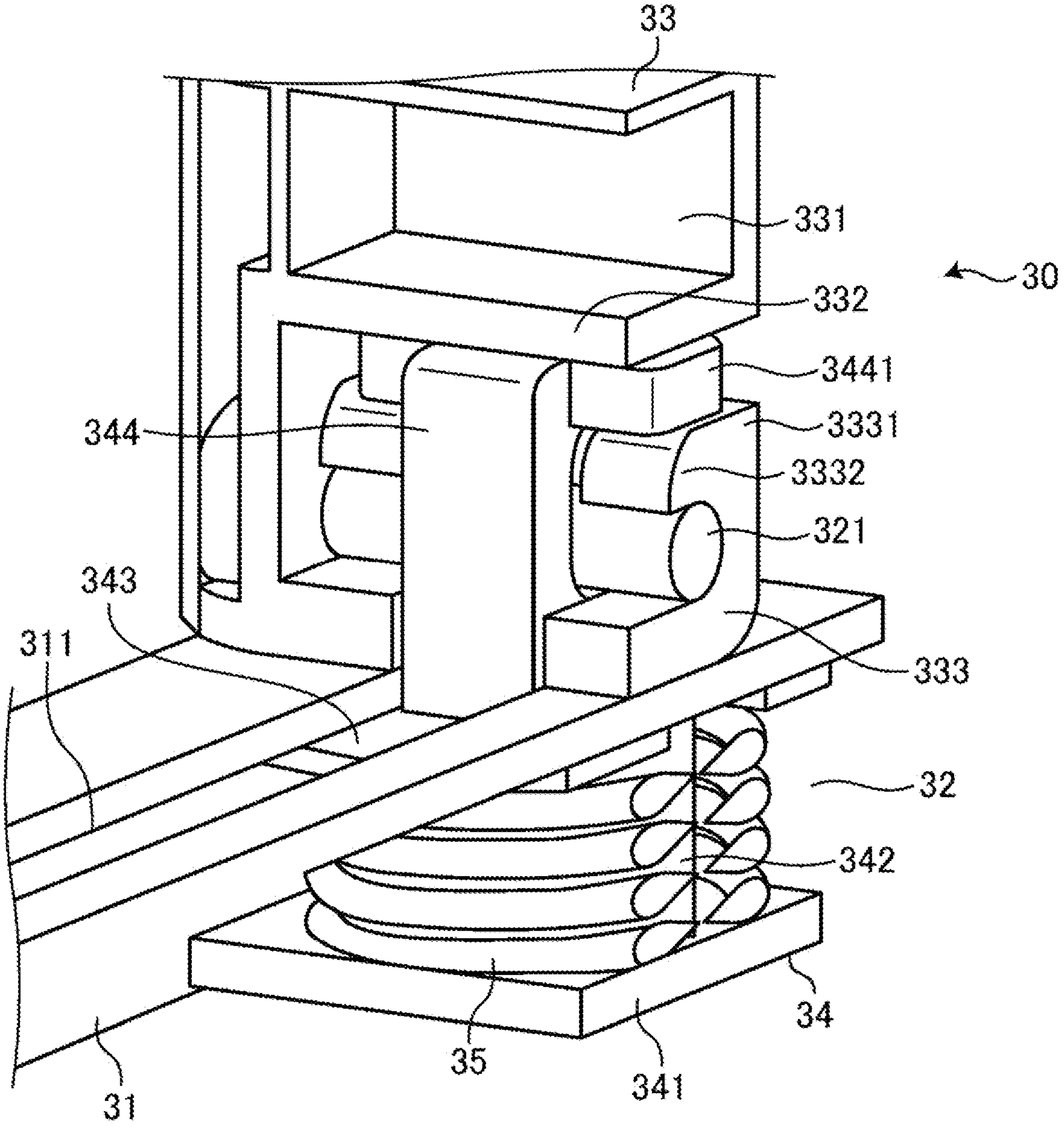
FIG. 5 is a diagram showing a main part of a holder of the label printer according to the embodiment.

Next, details of the structure of the holder 30 will be described. FIG. 5 is a diagram showing a main part of the holder 30. Note that FIG. 5 shows a state where part of the holder 30 is omitted in order to facilitate understanding of the structure of the holder 30. The holder 30 includes the shaft member 31, the moving member 32 including the guide member 33 and an adjustment member 34, and a coil spring 35. The coil spring 35 is an example of a biasing member.

One end of the shaft member 31 in the axial direction is cantilevered by the casing 2, as described above. The shaft member 31 includes a guide hole 311 that is formed along the axial direction and has a predetermined length. The guide hole 311 penetrates the shaft member 31 in the up-and-down direction in FIG. 5. The moving member 32 is inserted through the guide hole 311. The moving member 32 is guided by the guide hole 311 to be slidable on the shaft member 31 in the axial direction.

The moving member 32 includes the guide member 33 and the adjustment member 34. Further, the moving member 32 includes a connecting shaft portion 321 that rotatably supports the guide member 33 with respect to the adjustment member 34.

The guide member 33 is formed in a flat plate shape. The guide member 33 is in the standing state with respect to the shaft member 31 while the rolled paper 503 is set (see FIG. 4). The guide member 33 includes a plurality of recessed portions 331 on the inner surface facing the rolled paper 503 in the standing state. Further, the guide member 33 includes a plane portion on the outer surface side not facing the rolled paper 503 in the standing state. The plurality of recessed portions 331 is formed between a plurality of ribs 332. As a result, the guide member 33 achieves strength and is capable of causing the rolled paper 503 to smoothly rotate by reducing the contact area with the rotating rolled paper 503.

The guide member 33 is provided so that it can stand and fall with respect to the shaft member 31. Specifically, the guide member 33 is rotatably supported by the connecting shaft portion 321, so that it can stand and fall with respect to the shaft member 31.

The guide member 33 includes a shaft support portion 333 that is in sliding contact with approximately half of the outer peripheral surface of the connecting shaft portion 321. The shaft support portion 333 slides on the outer peripheral surface of the connecting shaft portion 321, and thus, the guide member 33 is rotatably supported by the connecting shaft portion 321. The shaft support portion 333 includes a pressing portion 3331 that presses a holding-down portion 3441 formed in the adjustment member 34 upward by entering between the connecting shaft portion 321 and the holding-down portion 3441 while the guide member 33 is in the standing state. Details of the holding-down portion 3441 will be described below.

The pressing portion 3331 of the shaft support portion 333 does not enter between the connecting shaft portion 321 and the holding-down portion 3441 while the guide member 33 is in the fallen state (see FIG. 2 and FIG. 3) and enters between the connecting shaft portion 321 and the holding-down portion 3441 in accordance with the standing operation of the guide member 33. A tip portion 3332 of the pressing portion 3331 has a tapered shape so as to be capable of easily entering between the connecting shaft portion 321 and the holding-down portion 3441 in accordance with the standing operation of the guide member 33.

The adjustment member 34 includes a spring receiving portion 341, a columnar portion 342, a washer 343, and a connecting portion 344.

The spring receiving portion 341 is formed in the lower end portion of the adjustment member 34 to have a flat plate shape. The spring receiving portion 341 abuts on the lower end of the coil spring 35. The columnar portion 342 is provided to protrude upward from the spring receiving portion 341. The columnar portion 342 is inserted through the central portion of the coil spring 35. The spring receiving portion 341 and the columnar portion 342 constitute a biasing member support portion.

The washer 343 is formed in a disc shape, a central hole through which the columnar portion 342 is inserted is formed in the central portion of the washer 343. The diameter of the central hole is smaller than the outer diameter of the coil spring 35 such that the lower surface of the washer 343 abuts on the coil spring 35. In other words, the coil spring 35 is held in a compressed state by the spring receiving portion 341 and the washer 343.

The upper surface of the washer 343 abuts on the shaft member 31. That is, the washer 343 is biased by the coil spring 35 to be pressed against the shaft member 31. The washer 343 is an example of a pressure contact portion that is biased by a biasing member (the coil spring 35) to be pressed against the shaft member 31.

The connecting portion 344 is provided to protrude upward from the columnar portion 342 and penetrates the guide hole 311. The connecting portion 344 includes the holding-down portion 3441 having a flat plate shape in the upper end portion thereof. The holding-down portion 3441 holds down the upper part of the connecting shaft portion 321 when the guide member 33 is in the fallen state. Further, the holding-down portion 3441 is pressed by the pressing portion 3331 when the guide member 33 is in the standing state to move upward.

The guide member 33 is supported by the connecting portion 344 and the connecting shaft portion 321 so as to be rotatable with respect to the adjustment member 34. As a result, the guide member 33 is supported by the connecting portion 344 and the connecting shaft portion 321 so that it can stand and fall with respect to the shaft member 31. The connecting portion 344 and the connecting shaft portion 321 constitute a guide member support portion that supports the guide member 33 so that it can stand and fall.

Figure 6:
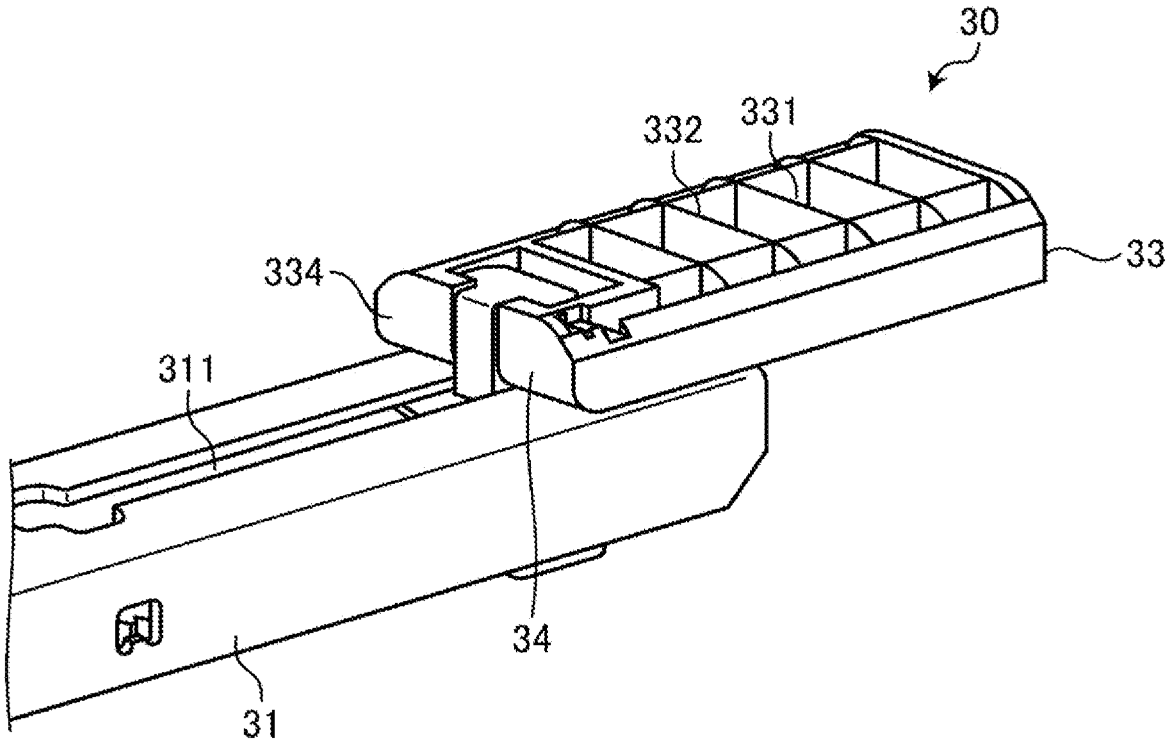
FIG. 6 is a diagram showing appearance of the holder in the case where a guide member according to the embodiment is in a fallen state.

FIG. 6 is a diagram showing appearance of the holder 30 in the case where the guide member 33 is in the fallen state. Part of the outer surface having a planar shape of the guide member 33 is placed on the upper surface of the shaft member 31. The guide member 33 is maintained horizontally together with the shaft member 31. A bottom surface 334 of the guide member 33 is orthogonal to the upper surface of the shaft member 31.

The width of the guide member 33 (length in the direction horizontally orthogonal to the axial direction of the shaft member 31) is substantially the same as the width of the shaft member 31. The width of the guide member 33 and the width of the shaft member 31 are each smaller than the diameter of the support hole 504 formed in the rolled paper 503 in the axial direction. Further, the sum of the thickness of the guide member 33 (length in the direction vertically orthogonal to the axial direction of the shaft member 31) and the thickness of the shaft member 31 is smaller than the diameter of the support hole 504 formed in the rolled paper 503 in the axial direction. Therefore, the guide member 33 and the shaft member 31 can be inserted through the support hole 504 of the rolled paper 503 while the guide member 33 is in the fallen state.

Figure 7:
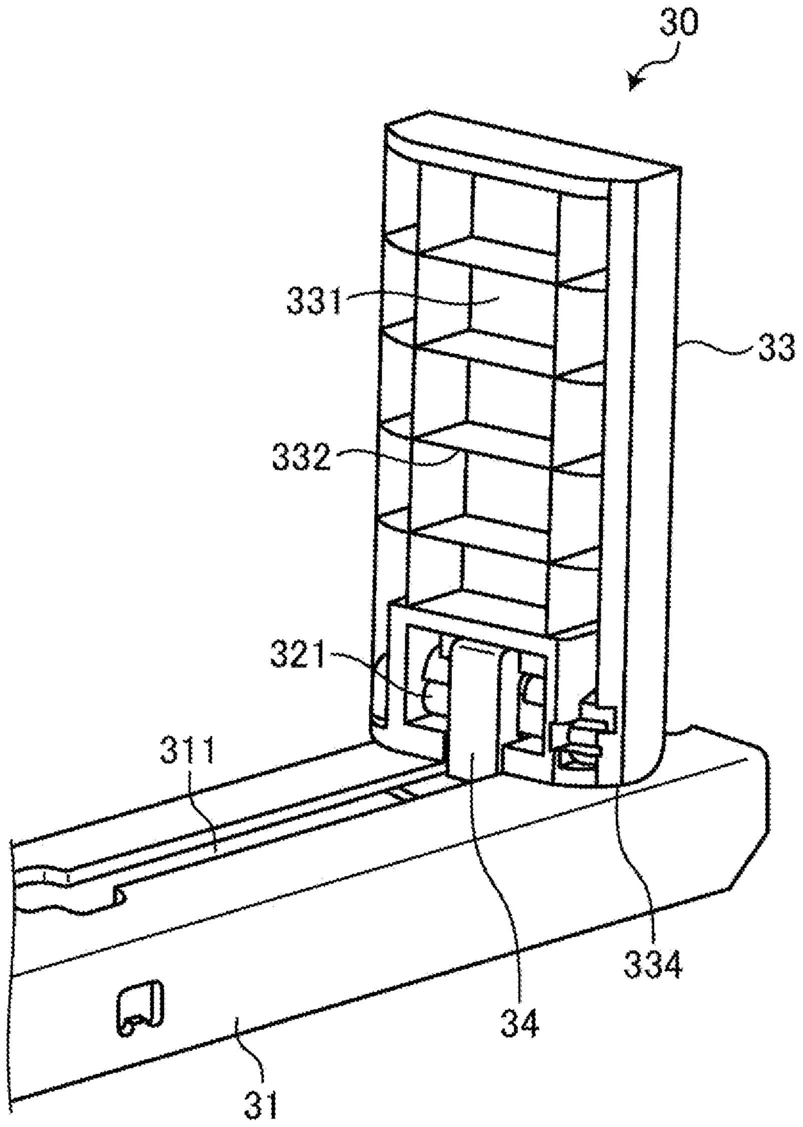
FIG. 7 is a diagram showing appearance of the holder in the case where the guide member is in a standing state in the label printer according to the embodiment.

FIG. 7 is a diagram showing appearance of the holder 30 in the case where the guide member 33 is in the standing state. The bottom surface 334 of the guide member 33 is in surface contact with the upper surface of the shaft member 31 to maintain the standing state of the guide member 33.

Figure 8:
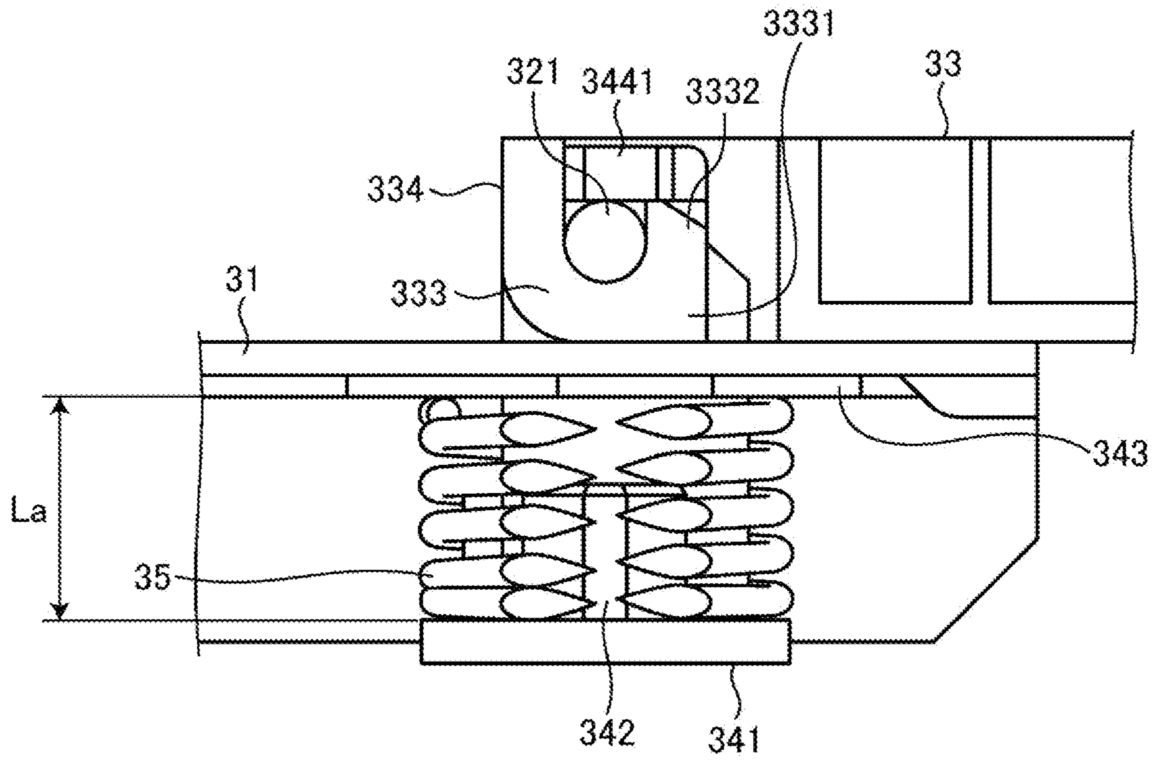
FIG. 8 is a diagram for describing an operation of the holder of the label printer according to the embodiment and is a diagram showing the guide member in a fallen state.

Next, the standing operation of the guide member 33 with respect to the shaft member 31 will be described. FIG. 8 is a diagram for describing an operation of the holder 30 and is a diagram showing the guide member 33 in the fallen state. In this state, the lower part of the connecting shaft portion 321 abuts on the circular arc surface of the shaft support portion 333 of the guide member 33. Further, the upper part of the connecting shaft portion 321 abuts on the holding-down portion 3441 of the adjustment member 34.

At this time, the pressing portion 3331 of the guide member 33 does not enter between the connecting shaft portion 321 and the holding-down portion 3441 of the adjustment member 34. For this reason, the pressing portion 3331 does not press the holding-down portion 3441 upward and the spring receiving portion 341 does not move upward. The spring length of the coil spring 35 in this state is “La”.

Figure 9:
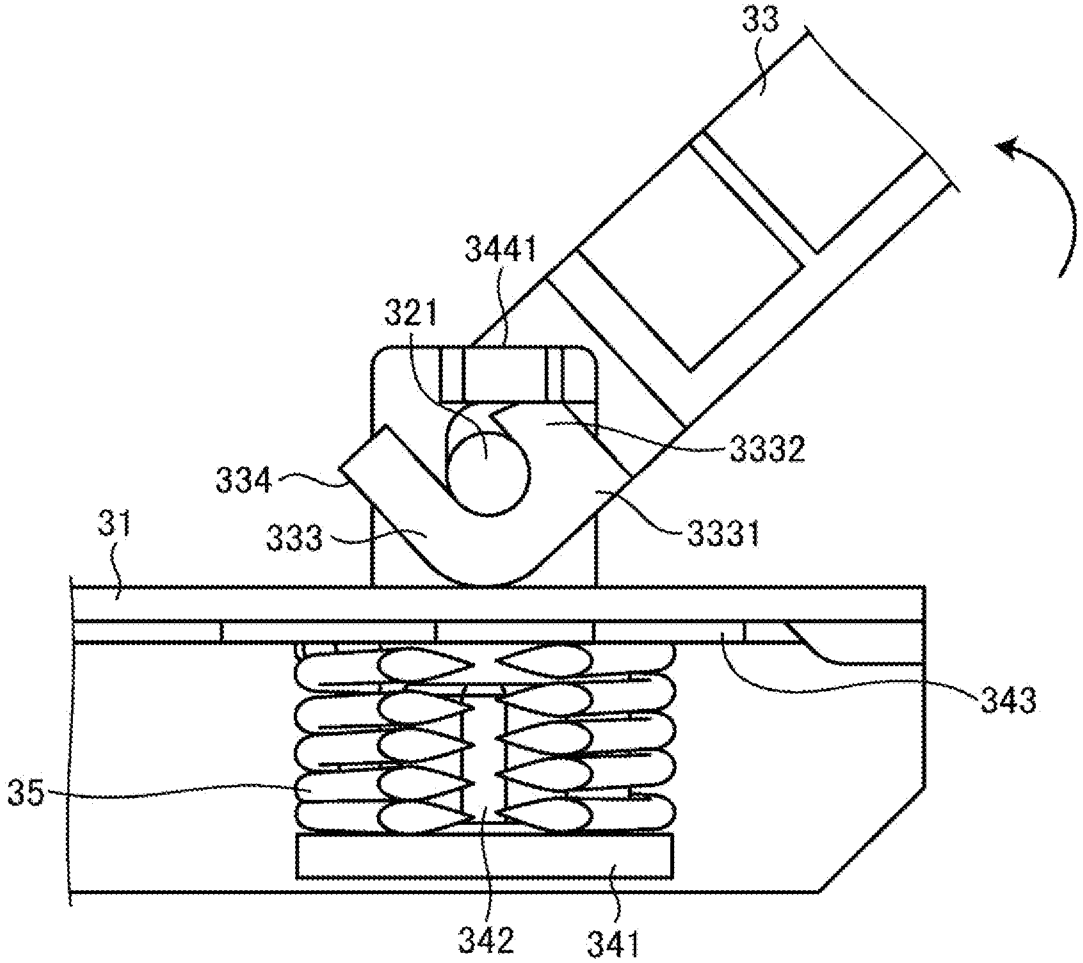
FIG. 9 is a diagram for describing an operation of the holder of the label printer according to the embodiment and is a diagram showing the guide member in a state in the middle of transitioning from the fallen state to the standing state.

FIG. 9 is a diagram for describing an operation of the holder 30 and is a diagram showing the guide member 33 in a state in the middle of transitioning from the fallen state to the standing state. A user causes, when causing the guide member 33 to stand, the guide member 33 to rotate in the direction indicated by the arrow in the figure. The circular arc surface formed on the outer periphery of the shaft support portion 333 of the guide member 33 slides on the upper surface of the shaft member 31. As a result, the user can cause the guide member 33 to smoothly stand.

When the guide member 33 stands from the fallen state, the tip portion 3332 of the pressing portion 3331 in the rotation direction enters between the connecting shaft portion 321 and the holding-down portion 3441 of the adjustment member 34. At this time, the lower surface of the holding-down portion 3441 has a planar shape, and a gap is formed between the lower surface of the holding-down portion 3441 and the outer peripheral surface of the connecting shaft portion 321 having a columnar shape. Further, the tip portion 3332 of the pressing portion 3331 in the rotation direction has a tapered shape. For this reason, the pressing portion 3331 is capable of smoothly entering between the connecting shaft portion 321 and the holding-down portion 3441 in accordance with the standing operation of the guide member 33.

The pressing portion 3331 enters between the connecting shaft portion 321 and the holding-down portion 3441 to cause the holding-down portion 3441 upward against the biasing force of the coil spring 35. The user causes the guide member 33 to rotate in the arrow direction until the bottom surface 334 having a planar shape of the guide member 33 is in surface contact with the upper surface of the shaft member 31.

Figure 10:
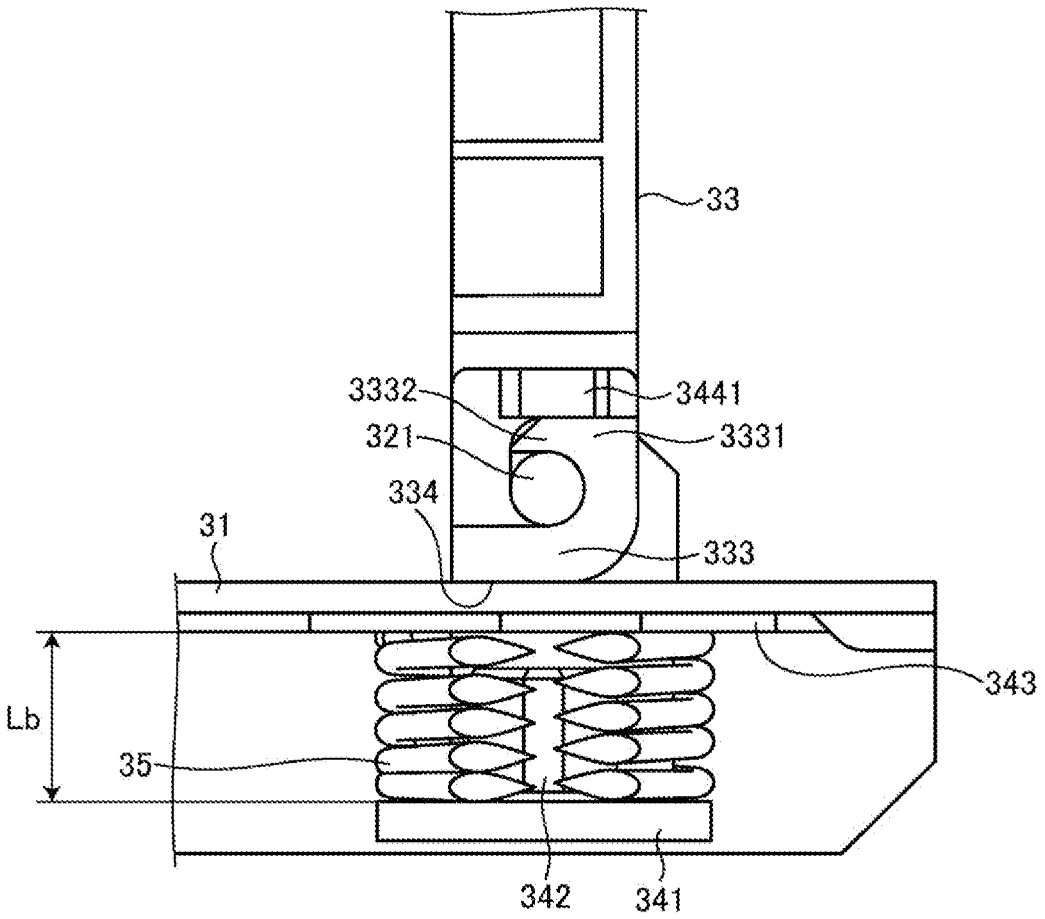
FIG. 10 is a diagram for describing an operation of the holder of the label printer according to the embodiment and is a diagram showing the guide member in the standing state.

FIG. 10 is a diagram for describing an operation of the holder 30 and is a diagram showing the guide member 33 in the standing state. In this state, the bottom surface 334 of the guide member 33 and the upper surface of the shaft member 31, which have planar shapes, are in surface contact with each other. As a result, the guide member 33 is capable of maintaining a stable standing state.

In this state, the pressing portion 3331 of the guide member 33 has entered between the connecting shaft portion 321 and the holding-down portion 3441 of the adjustment member 34. For this reason, the pressing portion 3331 has pressed the holding-down portion 3441 upward against the biasing force of the coil spring 35. When the holding-down portion 3441 is pressed upward, the spring receiving portion 341 integrally formed with the holding-down portion 3441 is also pressed upward. As a result, the coil spring 35 is compressed to obtain the spring length “Lb”.

The spring length “Lb” of the coil spring 35 when the guide member 33 is in the standing state shown in FIG. 10 is shorter than the spring length “La” when the guide member 33 is in the fallen state shown in FIG. 8. That is, the compression amount of the coil spring 35 is larger when the guide member 33 is in the standing state than in the fallen state.

For this reason, the holder 30 is capable of making the pressure contact force applied by the biasing force of the coil spring 35 to the washer 343 and the shaft member 31 larger in the standing state of the guide member 33 than in the fallen state of the guide member 33. In other words, the holder 30 is capable of making the braking force of the sliding movement of the moving member 32 including the guide member 33 and the adjustment member 34 with respect to the shaft member 31 larger in the standing state of the guide member 33 than in the fallen state of the guide member 33.

Therefore, it is possible to reduce, when a user sets the rolled paper 503 in the holder 30, the operation force necessary for adjusting the guide member 33 to the width of the rolled paper 503, and thus the holder 30 is capable of improving the operability of the user. Further, since the braking force against the sliding movement of the guide member 33 in the standing state while the rolled paper 503 is set can be increased, the holder 30 is capable of reliably guiding the rolled paper 503.

That is, the holder 30 according to this embodiment is capable of making the braking force smaller in the fallen state of the guide member 33 and larger in the standing state of the guide member 33, with a simple structure in which one coil spring 35 provides a braking force with respect to the sliding movement of the guide member 33. As a result, the holder 30 is capable of achieving both the improved operability for a user and the reliable guide of the rolled paper 503.

As described above, the label printer 1 according to this embodiment is a printer including: the holder 30 that rotatably supports the rolled paper 503; and the print head 13 that prints on the rolled paper 503 fed out from the holder 30. The holder 30 includes the shaft member 31, the moving member 32, the coil spring 35, and the adjustment member 34. The shaft member 31 is inserted through the support hole 504 formed in the rolled paper 503 in the axial direction. The moving member 32 is provided to be slidable on the shaft member 31 in the axial direction and includes the guide member 33 that can stand and fall with respect to the shaft member 31. The coil spring 35 presses the shaft member 31 and the moving member 32 together to restrain sliding movement of the moving member 32 with respect to the shaft member 31. The adjustment member 34 makes a pressure contact force applied by the coil spring 35 to the shaft member 31 and the moving member 32 larger in a fallen state of the guide member 33 than in a standing state of the guide member 33.

As a result, by adopting a structure in which the coil spring 35 provides a braking force with respect to the sliding movement of the guide member 33, the label printer 1 is capable of simplifying the structure of the holder 30. Further, the label printer 1 is capable of making the braking force by the coil spring 35 smaller in the fallen state of the guide member 33 and larger in the standing state of the guide member 33, and it is possible to achieve both the improved operability for a user and the reliable guide of the rolled paper 503.

Further, in the label printer 1 according to this embodiment, the adjustment member 34 includes the biasing member support portion (the spring receiving portion 341 and the columnar portion 342), the washer 343, and the guide member support portion (the connecting portion 344 and the connecting shaft portion 321). The biasing member support portion supports the coil spring 35. The washer 343 is biased by the coil spring 35 to be pressed against the shaft member 31. The guide member support portion supports the guide member 33 so that it can stand and fall.

As a result, the label printer 1 is capable of making the braking force by the coil spring 35 smaller in the fallen state of the guide member 33 and larger in the standing state of the guide member 33 without complicating the structure for supporting the guide member 33 so that it can stand and fall and the structure for supporting the coil spring 35.

Further, in the label printer 1 according to this embodiment, the guide member 33 includes the pressing portion 3331 that presses the adjustment member 34 in the direction of compressing the coil spring 35 in accordance with the standing operation with respect to the shaft member 31.

In addition, in the label printer 1 according to this embodiment, the guide member support portion (the connecting portion 344 and the connecting shaft portion 321) includes the holding-down portion 3441 that holds down the connecting shaft portion 321 connecting the guide member 33 so that it can stand and fall. The pressing portion 3331 enters between the connecting shaft portion 321 and the holding-down portion 3441 to press the adjustment member 34 in accordance with the standing operation with respect to the shaft member 31.

As a result, the label printer 1 is capable of changing the braking force by the coil spring 35 in conjunction with the standing operation of the guide member 33.

Further, in the label printer 1 according to this embodiment, the pressing portion 3331 includes the tip portion 3332 that can be inserted between the connecting shaft portion 321 and the holding-down portion 3441 and has a tapered shape.

As a result, the label printer 1 is capable of making the standing operation of the guide member 33 for changing the braking force by the coil spring 35 smooth.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:

a holder that rotatably supports a rolled print medium; and a printing unit that prints on the rolled print medium fed out from the holder, wherein the holder includes a shaft member to be inserted through a support hole formed in the rolled print medium in an axial direction, a moving member that is provided to be slidable on the shaft member in the axial direction with respect to the shaft member and includes a guide member that can be in a standing state in which the guide member extends in a direction perpendicular to the axial direction and in a fallen state in which the quide member extends in the axial direction, a biasing member that presses the shaft member and the moving member together to provide a braking force against sliding movement of the moving member with respect to the shaft member during the standing state and the fallen state of the quide member, and an adjustment member that makes a pressure contact force applied by the biasing member to the shaft member and the moving member larger in the standing state of the guide member than in the fallen state of the guide member so that the braking force is larger in the standing state than in the fallen state.

2. The printer according to claim 1, wherein the adjustment member includes a biasing member support portion that supports the biasing member, a pressure contact portion that is biased by the biasing member to be pressed against the shaft member, and a guide member support portion that supports the guide member so that the guide member can stand and fall.

3. The printer according to claim 2, wherein the guide member includes a pressing portion that presses the adjustment member in a direction of compressing the biasing member in accordance with a standing operation with respect to the shaft member.

4. The printer according to claim 3, wherein the guide member support portion includes a holding-down portion that holds down a connecting shaft portion connecting the guide member so that the guide member can stand and fall, and the pressing portion enters between the connecting shaft portion and the holding-down portion to press the adjustment member in accordance with the standing operation with respect to the shaft member.

5. The printer according to claim 4, wherein the pressing portion includes a tip portion that can be inserted between the connecting shaft portion and the holding-down portion.

6. The printer according to claim 1, wherein the adjustment member includes a biasing member support portion that supports the biasing member.

7. The printer according to claim 1, wherein the adjustment member includes a pressure contact portion that is biased by the biasing member to be pressed against the shaft member.

8. The printer according to claim 1, wherein the adjustment member includes a guide member support portion that supports the guide member so that the guide member can stand and fall.

9. The printer according to claim 1, wherein the adjustment member includes a biasing member support portion that supports the biasing member and a pressure contact portion that is biased by the biasing member to be pressed against the shaft member.

10. The printer according to claim 1, wherein the adjustment member includes a biasing member support portion that supports the biasing member and a guide member support portion that supports the guide member so that the guide member can stand and fall.

* * * * *